(12) United States Patent
Ohkubo et al.

(10) Patent No.: US 8,970,835 B2
(45) Date of Patent: Mar. 3, 2015

(54) OPTICAL CHARACTERISTIC MEASURING APPARATUS

(71) Applicant: Otsuka Electronics Co., Ltd., Hirakata-shi, Osaka (JP)

(72) Inventors: Kazuaki Ohkubo, Kusatsu (JP); Hisashi Shiraiwa, Koka (JP)

(73) Assignee: Otsuka Electronics Co., Ltd., Hirakata-Shi (JP)

( * ) Notice: Subject to any disclaimer, the term of this patent is extended or adjusted under 35 U.S.C. 154(b) by 33 days.

(21) Appl. No.: 13/670,397

(22) Filed: Nov. 6, 2012

(65) Prior Publication Data
US 2014/0021338 A1      Jan. 23, 2014

(30) Foreign Application Priority Data

Jul. 19, 2012    (JP) ................. 2012-160527

(51) Int. Cl.
  *G01J 1/04*     (2006.01)
  *G02B 17/00*    (2006.01)
  *G01J 3/02*     (2006.01)
  *G02B 5/08*     (2006.01)
  *G01J 1/02*     (2006.01)
  *G01J 1/42*     (2006.01)
  *G01J 3/50*     (2006.01)

(52) U.S. Cl.
  CPC . *G02B 17/00* (2013.01); *G01J 1/04* (2013.01); *G01J 3/0254* (2013.01); *G01J 1/0407* (2013.01); *G02B 5/08* (2013.01); *G01J 1/0425* (2013.01); *G01J 3/0218* (2013.01); *G01J 3/0262* (2013.01); *G01J 1/0214* (2013.01); *G01J 2001/4252* (2013.01); *G01J 2001/0481* (2013.01); *G01J 3/505* (2013.01)
  USPC .................. 356/236; 250/231.13; 250/231.16

(58) Field of Classification Search
  USPC ............. 250/231.13, 231.14, 231.15, 231.16, 250/231.17, 231.18; 356/236
  See application file for complete search history.

(56) References Cited

U.S. PATENT DOCUMENTS

| 5,430,540 A  * | 7/1995 | Ohkubo ................. 356/236 |
| 7,521,667 B2 * | 4/2009 | Rains et al. ............ 250/228 |
| 2009/0109428 A1 | 4/2009 | Ohkubo |

FOREIGN PATENT DOCUMENTS

| JP | 50-126280 U  | 10/1975 |
| JP | 03-162634    | 7/1991  |

(Continued)

OTHER PUBLICATIONS

JIS C 8152:2007 "Measuring methods of white light emitting diode for general lighting", Jul. 20, 2007.

(Continued)

*Primary Examiner* — Tony Ko
(74) *Attorney, Agent, or Firm* — Mori & Ward, LLP

(57) ABSTRACT

An optical characteristic measuring apparatus includes a hemispheric portion having a reflective surface on its inner wall, and a plane portion arranged to close an opening of the hemispheric portion and having a reflective surface on an inner-wall side of the hemispheric portion. The plane portion includes a first window occupying a range including a substantial center of curvature of the hemispheric portion for attaching a light source to the first window. At least one of the hemispheric portion and the plane portion includes a plurality of second windows arranged in accordance with a predetermined rule for extracting light from inside the hemispheric portion.

3 Claims, 16 Drawing Sheets

(56) References Cited

FOREIGN PATENT DOCUMENTS

| | | |
|---|---|---|
| JP | 06-167388 | 6/1994 |
| JP | 07-116530 | 5/1995 |
| JP | 2009-103654 | 5/2009 |
| JP | 4932045 B1 | 5/2012 |
| WO | WO 2010/140484 | 12/2010 |

OTHER PUBLICATIONS

Japanese Office Action for corresponding JP Application No. 2012-160527, May 14, 2013.

Japanese Office Action for corresponding Jp Application No. 2012-160527, Oct. 15, 2013.

* cited by examiner

OPTICAL CHARACTERISTIC MEASURING APPARATUS

BACKGROUND OF THE INVENTION

1. Field of the Invention

The present invention relates to an optical characteristic measuring apparatus suitable for taking measurements of a surface light source and the like.

2. Description of the Background Art

Recently, development of new light sources such as LED (Light Emitting Diode) and EL (Electro Luminescence) has been advancing rapidly. As an indicator for evaluating the performance of such light sources, the total luminous flux (lm: lumen) is often used.

In order to measure the total luminous flux of such a light source, an integrating sphere (spherical photometer) is commonly used that is a hollow sphere in which a diffuse reflective material such as barium sulfate or PTFE (polytetrafluoroethylene) is applied to the inner wall surface of the hollow sphere. In the case of a measurement method using the integrating sphere, a light source arranged at the center of the integrating sphere is lit, the light radiated from the light source is repeatedly reflected from the inner wall surface, and accordingly the illuminance on the inner wall surface is made uniform. The fact that the illuminance on the inner wall surface which has thus been made uniform is proportional to the total luminous flux of the light source is utilized to calculate the total luminous flux of the light source.

In the case of the measurement method using the integrating sphere, however, the light source is arranged at the center inside the integrating sphere, and therefore, a measurement error may arise due to absorption of light by a structure arranged for supporting the light source, absorption of light by a baffle arranged for preventing the light from the light source from directly irradiating an optical receiver, and absorption of light by the light source itself, and the like.

For example, according to JIS C 8152:2007 "Measuring Methods of White Light Emitting Diode (LED) for General Lighting," use of a method for determining a self-absorption correction factor of the light source is recommended. This method, however, cannot make corrections for absorption of light by the structure arranged for supporting the light source and absorption of light by the baffle.

Japanese Patent Laying-Open No. 06-167388 and Japanese Patent Laying-Open No. 2009-103654 each disclose a hemispherical photometer. This hemispherical photometer does not require the structure arranged for supporting the light source and therefore can avoid the influence of absorption of light by this structure. Moreover, the hemispherical photometer can correct errors due to self absorption of light by the light source by means of a simple configuration as disclosed in Japanese Patent Laying-Open No. 2009-103654.

SUMMARY OF THE INVENTION

A plurality of light-emitting devices for example can be arranged in the form of an array to constitute a surface light source. The inventors of the present application have found a new problem that a measurement error may occur when a measurement of such a surface light source is taken, because a light-emitting device at a central portion of the surface light source and a light-emitting device at an end thereof are different from each other in terms of the positional relationship with an observation window.

The present invention has been made to solve this new problem, and an object of the invention is to provide an optical characteristic measuring apparatus suitable for taking measurements of a surface light source and the like.

An optical characteristic measuring apparatus according to an aspect of the present invention includes: a hemispheric portion having a reflective surface on an inner wall of the hemispheric portion; and a plane portion arranged to close an opening of the hemispheric portion and having a reflective surface on an inner-wall side of the hemispheric portion. The plane portion includes a first window occupying a range including a substantial center of curvature of the hemispheric portion for attaching a light source to the first window. At least one of the hemispheric portion and the plane portion includes a plurality of second windows arranged in accordance with a predetermined rule for extracting light from inside the hemispheric portion.

Preferably, the plurality of second windows are arranged symmetrically with respect to a line passing through an apex and the substantial center of curvature of the hemispheric portion.

Preferably, the plurality of second windows include a pair of windows opposite to each other with respect to a line passing through an apex and the substantial center of curvature of the hemispheric portion.

Preferably, the plurality of second windows are arranged in the hemispheric portion, and the hemispheric portion includes baffles associated with respective fields of view of the second windows and arranged closer to the substantial center of curvature of the hemispheric portion.

Preferably, the optical characteristic measuring apparatus further includes an optical receiver for receiving light inside the hemispheric portion through the plurality of second windows.

More preferably, the optical characteristic measuring apparatus further includes an optical guide optically connecting the plurality of second windows to the optical receiver. The optical guide includes an optical coupler coupling respective light beams from the plurality of second windows.

An optical characteristic measuring apparatus according to another aspect of the present invention includes a spherical body having a first window formed for attaching a light source to the first window and having a reflective surface on an inner wall of the spherical body. The spherical body includes a plurality of second windows arranged symmetrically with respect to a line passing through a center of the spherical body and a center of the first window for extracting light from inside the spherical body.

Preferably, the optical characteristic measuring apparatus further includes an optical receiver for receiving light inside the spherical body through the plurality of second windows.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
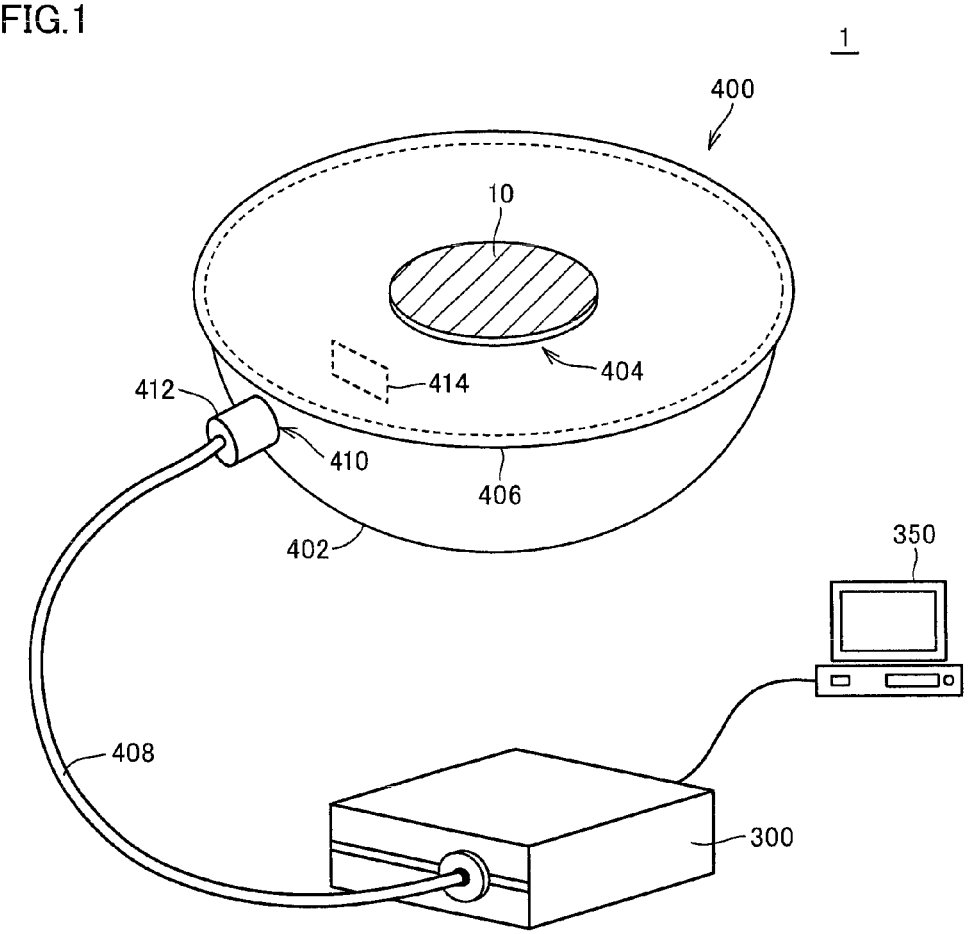
FIG. 1 is a schematic diagram showing an external appearance of an optical characteristic measuring apparatus including a hemispherical integrator according to a relevant art of the present invention.

Embodiments of the present invention will be described in detail with reference to the drawings. It should be noted that the same or corresponding components in the drawings are denoted by the same reference characters, and a description thereof will not be repeated.

A. Overview

An optical characteristic measuring apparatus according to the present embodiment takes measurements by means of an integrating space provided with a plurality of observation windows. A plurality of observation windows are provided to thereby equalize variation in illuminance which occurs depending on the size of a light source to be measured. Namely, a plurality of observation windows are provided to thereby reduce anisotropy of the sensitivity.

B. Relevant Art and Problem

First, an optical characteristic measuring apparatus relevant to the present invention will be described. FIG. 1 is a schematic diagram showing an external appearance of an optical characteristic measuring apparatus 1 including a hemispherical integrator according to a relevant art of the present invention.

Referring to FIG. 1, optical characteristic measuring apparatus 1 includes a hemispherical integrator 400, an optical receiver 300 for receiving the light inside integrator 400, and a control unit 350 for controlling optical receiver 300. A light source 10 to be measured (sample light source) is attached to a light source window 404 provided to integrator 400. Light generated by turning on light source 10 is repeatedly reflected within integrator 400, and accordingly the illuminance on the inner wall surface of integrator 400 is made uniform. The illuminance which has been made uniform is measured to thereby calculate the total luminous flux from light source 10.

More specifically, integrator 400 includes a hemispheric portion 402 having a reflective surface on its inner wall, and a plane portion 406 arranged to close the opening of hemispheric portion 402 and having a reflective surface on the inner-wall side of hemispheric portion 402. Hemispheric portion 402 has a diffuse reflective layer as a reflective surface on its inner wall. The diffuse reflective layer is typically formed by applying or spraying a diffuse material such as barium sulfate or PTFE (polytetrafluoroethylene). In contrast, plane portion 406 has, on the inner-wall side of hemispheric portion 402, a specular reflective layer making specular reflection (regular reflection).

The specular reflective layer of plane portion 406 is arranged opposite to the inner wall of hemispheric portion 402, and thus a virtual image for hemispheric portion 402 is generated. Plane portion 406 is arranged to pass through the center of curvature of hemispheric portion 402. The virtual image generated by plane portion 406 is in the shape of a hemisphere having a constant curvature. An integrating space (real image) defined by the inner wall of hemispheric portion 402 and the virtual image generated by plane portion 406 can be combined to obtain an illuminance distribution that is substantially identical to an illuminance distribution to be obtained by means of a spherical integrator.

Hemispheric portion 402 is provided with an observation window 410 which is an opening for extracting light from inside hemispheric portion 402, and an extraction member 412 communicating with observation window 410. Extraction member 412 is optically connected to optical receiver 300 through an optical fiber 408 which is optical guide means. Optical receiver 300 measures the light guided through a path made up of observation window 410, extraction member 412, and optical fiber 408.

The inner wall of hemispheric portion 402 is provided with a baffle 414 for preventing the light from light source 10 from directly irradiating observation window 410. Baffle 414 generates a shadow so that light source 10 is not included in the field of view from observation window 410.

Figure 2A:
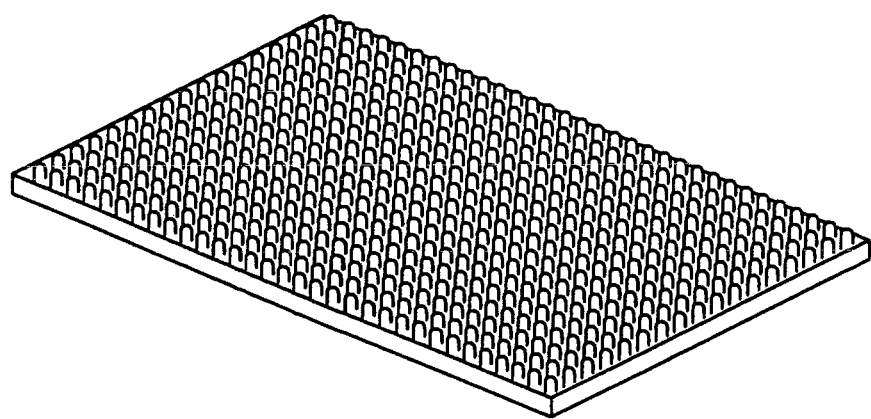
FIGS. 2A and 2B are each a schematic diagram showing an example of the light source for which a measurement is taken by the optical characteristic measuring apparatus shown in FIG. 1.
Figure 2B:
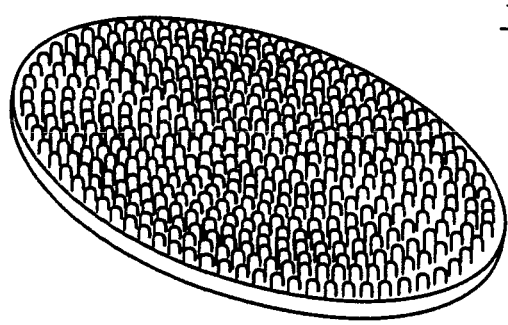

Optical characteristic measuring apparatus 1 shown in FIG. 1 is typically suitable for measurement of the total luminous flux of a surface light source and the like. FIGS. 2A and 2B are each a schematic diagram showing an example of light source 10 to be measured by optical characteristic measuring apparatus 1 shown in FIG. 1. It is supposed that light source 10 is a light source as shown in FIG. 2A having a plurality of light-emitting devices (typically LED) arranged in the form of an array on a rectangular substrate, or a light source as shown in FIG. 2B having a plurality of light-emitting devices arranged in the form of an array on a circular substrate.

Specific measurements of such a light source 10 to be taken may include measurement of the total luminous flux radiated from light source 10 and measurement of the luminous flux radiated from each light-emitting device (LED). In the case where measurements of individual light-emitting devices are to be taken, the light-emitting devices constituting light source 10 are successively turned on one by one to take measurements. Alternatively, the luminous flux radiated from a group of light-emitting devices belonging to each row of the array may be measured in some cases.

The inventors of the present application have found the new problem that a measurement error may occur when a measurement of light source 10 is taken, because a light-emitting device located at a central portion of light source 10 and a light-emitting device located at an end thereof are different from each other in terms of the positional relationship with observation window 410. For example, the new problem found by the inventors is that, in the case where light source 10 has a plurality of light-emitting devices mounted in the form of an array and these light-emitting devices are successively turned on to measure the total luminous flux of each light-emitting device, the measured values are different from each other depending on the position where the light-emitting device is mounted, even if respective total luminous fluxes radiated from the light-emitting devices are identical to each other. Namely, the inventors have found a new problem that the sensitivity may involve anisotropy.

Figure 3:
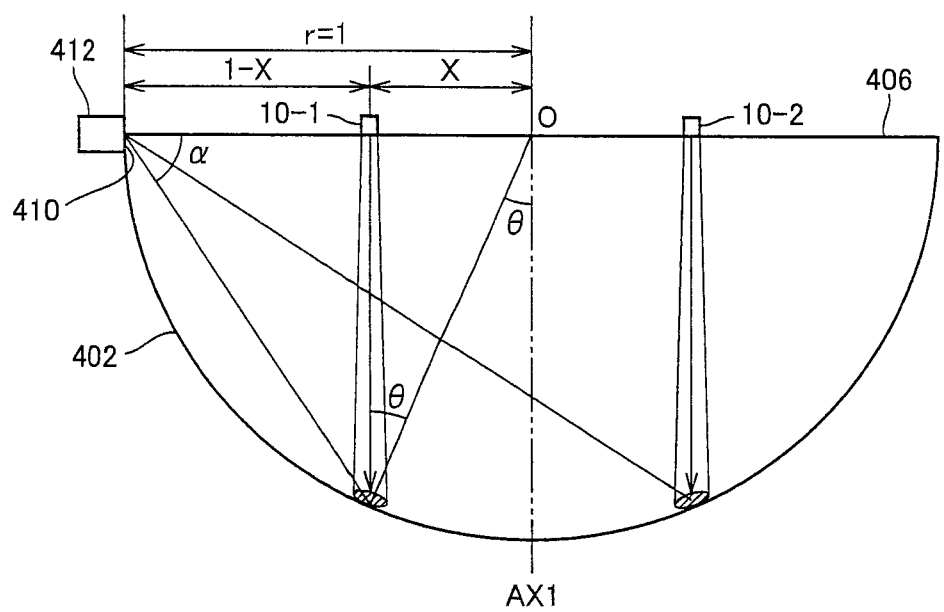
FIG. 3 is a diagram showing an optical model used for simulating anisotropy of the sensitivity obtained in the optical characteristic measuring apparatus shown in FIG. 1.
Figure 4:
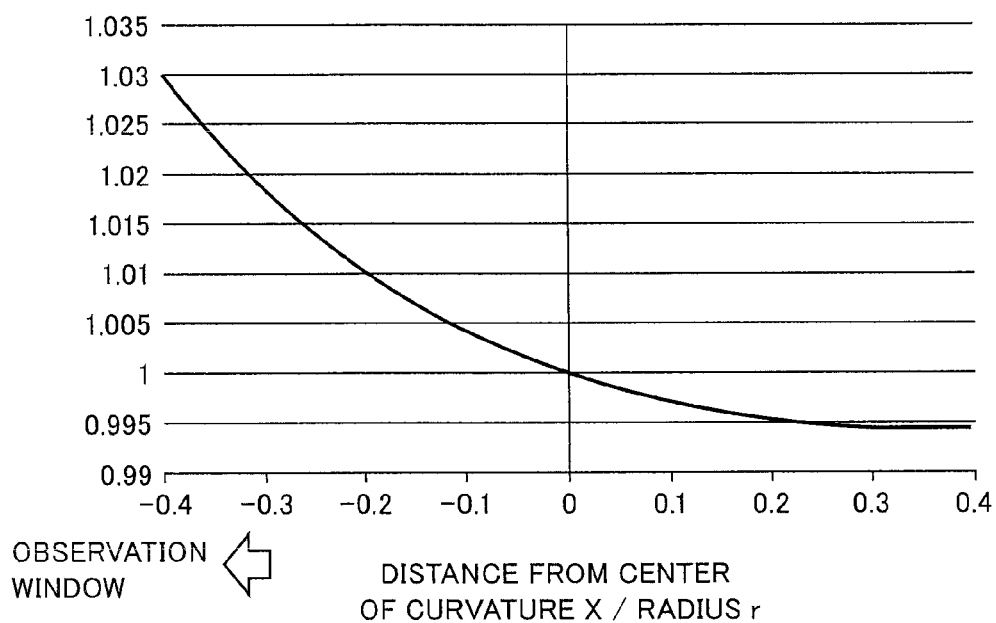
FIG. 4 is a diagram showing an example of the anisotropy of the sensitivity obtained in the optical model shown in FIG. 3.

In order to address the new problem, the inventors have conducted an analysis based on simulation by means of the following optical model. FIG. 3 is a diagram showing an optical model used for simulating the anisotropy of the sensitivity obtained in optical characteristic measuring apparatus 1 shown in FIG. 1. FIG. 4 is a diagram showing an example of the anisotropy of the sensitivity obtained in the optical model shown in FIG. 3.

It is supposed that, in the optical model shown in FIG. 3, the luminous intensity distribution of light-emitting devices 10-1 and 10-2 constituting light source 10 is relatively narrow. For each of respective positions of the light-emitting devices, the illuminance generated by direct illumination of observation window 410 by primary reflected light generated on the wall surface of hemispheric portion 402 is calculated. It is seen that the illuminance varies depending on the position of the light-emitting device. Specifically, the light (primary reflected light and diffused light) that is input to optical receiver 300 is the one as shown in FIG. 4 where "r" is the radius of hemispheric portion 402, and "X" is the distance from the center of curvature O of hemispheric portion 402 and represents the position of each light-emitting device. Here, it is supposed that respective total luminous fluxes from the light-emitting devices are identical to each other. Thus, the light (illuminance at observation window 410) that is input to optical receiver 300 varies depending on the position of the light-emitting device.

This will be described more specifically. Optical receiver 300 receives the primary reflected light and the diffused light at the same time. The light (diffused light) having been repeatedly reflected from the inner wall of hemispherical integrator 400 is constant without depending on the position of the light-emitting device. In contrast, as for the primary reflected light, its intensity (illuminance) varies depending on the position of the light-emitting device, and therefore, the output of optical receiver 300 also varies depending on the position of the light-emitting device. A reason why the illuminance thus varies is considered as the anisotropy of the sensitivity that arises due to the fact that observation window 410 is provided near plane portion 406.

The inventors have studied the above-described new problem to reach a new technical idea that a plurality of observation windows can be provided to thereby alleviate such anisotropy of the sensitivity. In the following, some embodiments that embody this technical idea will be described. The embodiments described in the following are given solely by way of example and the technical scope of the present invention is not limited to them.

C. First Embodiment

<1. Configuration of Apparatus>

Figure 5:
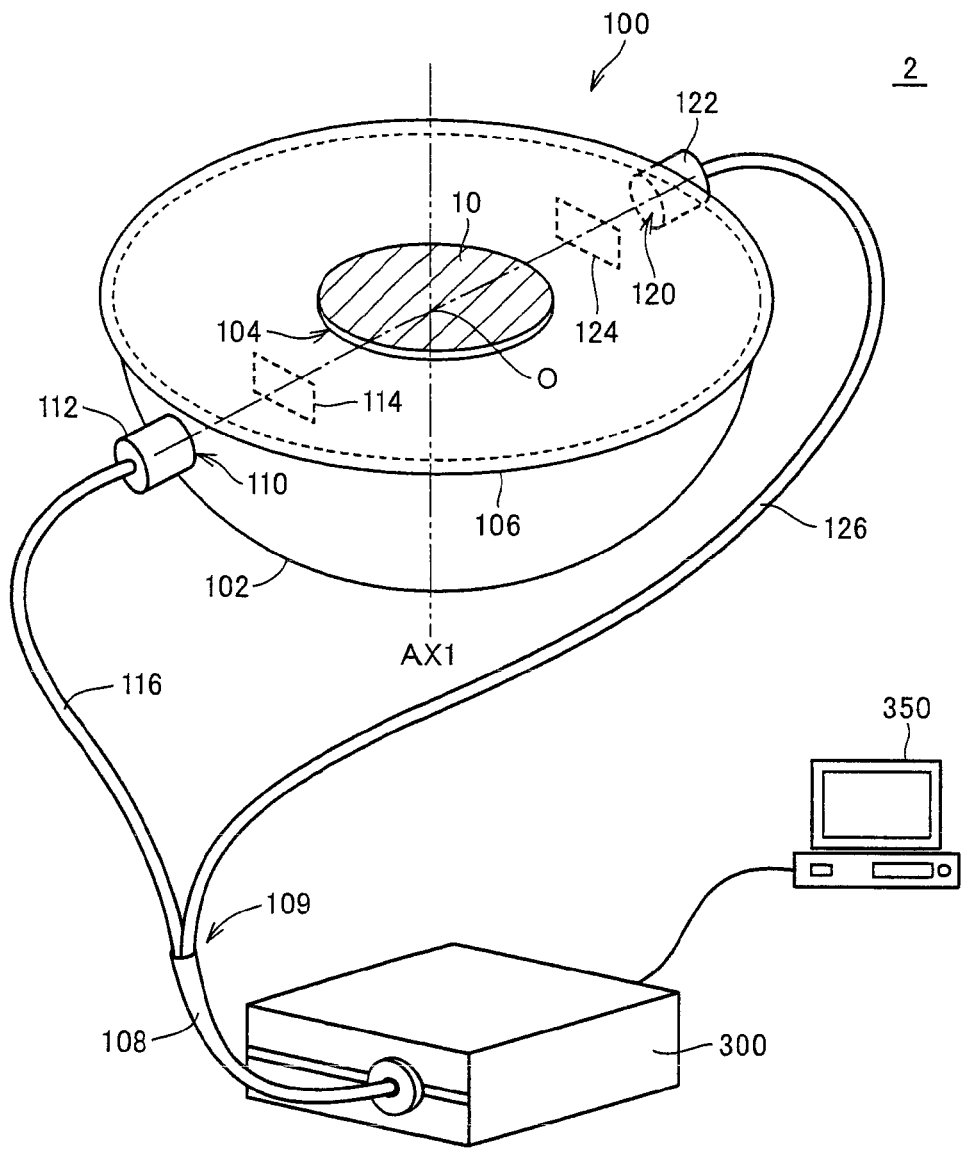
FIG. 5 is a schematic diagram showing an external appearance of an optical characteristic measuring apparatus according to a first embodiment.
Figure 6:
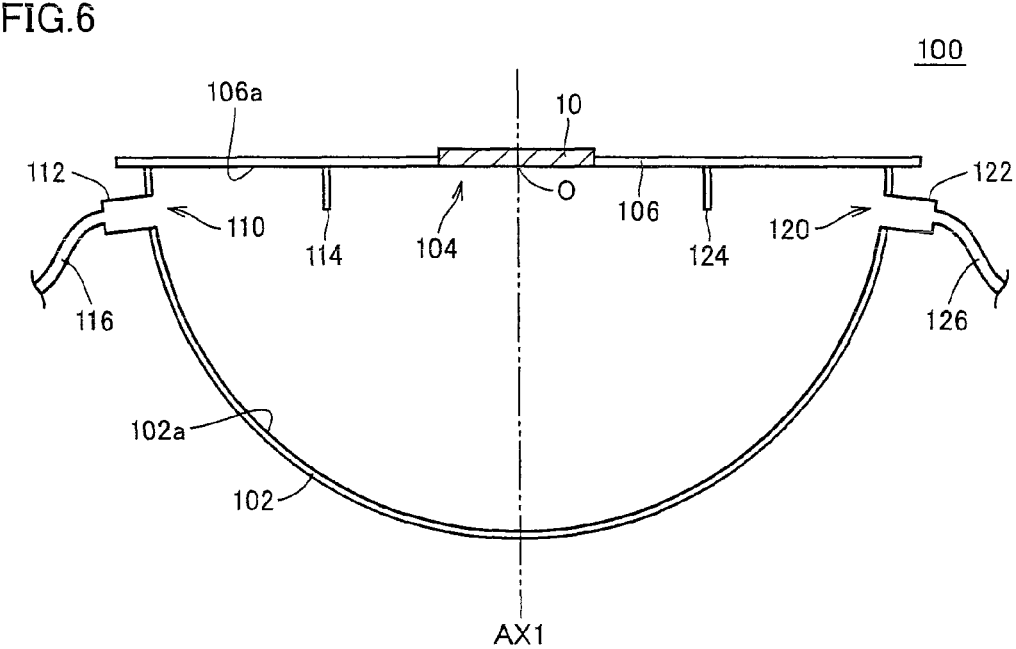
FIG. 6 is a schematic diagram showing a cross-sectional structure of an integrator included in the optical characteristic measuring apparatus according to the first embodiment.

FIG. 5 is a schematic diagram showing an external appearance of an optical characteristic measuring apparatus 2 according to a first embodiment. FIG. 6 is a schematic diagram showing a cross-sectional structure of an integrator 100 included in optical characteristic measuring apparatus 2 according to the first embodiment.

Referring to FIGS. 5 and 6, optical characteristic measuring apparatus 2 includes hemispherical integrator 100, an optical receiver 300 for receiving the light inside integrator 100, and a control unit 350 for controlling optical receiver 300.

More specifically, integrator 100 includes a hemispheric portion 102 having a reflective surface 102*a* on its inner wall, and a plane portion 106 arranged to close the opening of hemispheric portion 102 and having a reflective surface 106*a* on the inner-wall side of hemispheric portion 102. Typically, reflective surface 102*a* of hemispheric portion 102 is provided for example by a diffuse reflective layer formed by applying or spraying a diffuse material such as barium sulfate or PTFE. Reflective surface 106*a* of plane portion 106 is provided by a specular reflective (regular reflective) layer formed by vapor deposition of aluminum or the like. Plane portion 106 is arranged so that the substantial center of curvature O of hemispheric portion 102 is located on the surface of plane portion 106.

Plane portion 106 of integrator 100 is provided with a light source window 104 occupying a range including the substantial center of curvature O of hemispheric portion 102, for attaching a light source 10 to be measured to light source window 104. To this light source window 104, typically light source 10 which is a surface light source or the like is attached. While optical characteristic measuring apparatus 2 according to the first embodiment is suitable for measurement of optical characteristics (total luminous flux for example) of a surface light source or the like, the apparatus is not limited to this and can measure optical characteristics of any light source that can be attached to light source window 104.

As described above with reference to FIG. 1, the light generated by turning on light source 10 is repeatedly reflected within integrator 100, and accordingly the illuminance on the inner wall surface of integrator 100 is made uniform. The illuminance having been made uniform is measured to thereby calculate the total luminous flux from light source 10. Thus, hemispheric portion 102 having reflective surface 102*a* on its inner wall and plane portion 106 having reflective surface 106*a* can be combined to thereby obtain an illuminance distribution which is substantially identical to an illuminance distribution to be obtained by means of a spherical integrator. Namely, integrator 100 is configured so that a combination of the space formed between plane portion 106 and hemispheric portion 102 and a virtual image of this space generated by plane portion 106 can be identified as a sphere. Therefore, "substantial center of curvature of hemispheric portion 102" is a concept including, in addition to the exact center of curvature O of hemispheric portion 102, its nearby positions with which an illuminance distribution can be obtained that is substantially identical to the illuminance distribution to be obtained by means of a spherical integrating sphere as described above.

Hemispheric portion 102 is provided with observation windows 110 and 120 which are each an opening for extracting light from inside integrator 100, as well as extraction members 112 and 122 communicating respectively with observation windows 110 and 120. Extraction member 112 is optically connected to optical receiver 300 through an optical fiber 116 which is optical guide means, and extraction member 122 is optically connected to optical receiver 300 through an optical fiber 126 which is optical guide means. More specifically, optical fibers 116 and 126 are coupled into one fiber at an optical coupler 109, and then optically connected to optical receiver 300 through an optical fiber 108. Optical coupler 109 couples the light guided through optical fiber 116 and the light guided through optical fiber 126 together to thereby average (integrate) them. Such an optical coupler 109 is typically configured by means of a Y-shaped fiber or the like which is a bundle of a plurality of optical fibers.

Thus, optical characteristic measuring apparatus 1 includes optical receiver 300 for receiving the light inside integrator 100 through a plurality of observation windows 110 and 120. Optical characteristic measuring apparatus 1 also includes a connector (optical fibers 116 and 126 as well as optical fiber 108) for optically connecting a plurality of observation windows 110 and 120 to optical receiver 300. This connector includes optical coupler 109 coupling respective light beams from a plurality of observation windows 110 and 120. Namely, the light beams captured respectively in a plurality of observation windows 110 and 120 are guided to optical receiver 300 by the optical guide means such as optical fiber.

The inner wall of hemispheric portion 102 is provided with baffles 114 and 124 associated with respective fields of view of observation windows 110 and 120 and arranged closer to the substantial center of curvature O of hemispheric portion 102. More specifically, baffles 114 and 124 prevent the light from light source 10 from directly irradiating observation windows 110 and 120. Namely, baffles 114 and 124 generate respective shadows so that light source 10 is not included in respective fields of view from observation windows 110 and 120. In other words, baffles 114 and 124 hinder optical receiver 300 from directly receiving the light from light source 10.

Optical receiver 300 measures the illuminance at observation windows 110 and 120 and calculates, for example, the total luminous flux of light source 10. Optical receiver 300 may be configured to measure the illuminance in at least a specific wavelength range, or to measure the relative illuminance spectrum. Optical receiver 300 includes a diffraction grating and a line sensor or the like associated optically with the diffraction grating. Optical receiver 300 which is capable of spectrometry can be employed to perform evaluation of the essential performance of the light source such as chromaticity, correlated color temperature, and color rendering, in addition to the total luminous flux.

Control unit 350 gives instructions such as an instruction to start measurement and an instruction concerning processing details, and also outputs the result of measurement performed by optical receiver 300, and the like. It should be noted that computation itself which is done for calculating the total luminous flux of light source 10 may be performed by control unit 350. Control unit 350 is typically implemented by a general-purpose computer. Namely, control unit 350 is made up of components such as processor, memory, and hard disk. The processor executes a program to thereby implement a variety of processing operations necessary for optical characteristic measuring apparatus 2.

In optical characteristic measuring apparatus 2 according to the first embodiment shown in FIGS. 5 and 6, hemispheric portion 102 is provided with two observation windows 110 and 120 by way of example. These observation windows 110 and 120 are arranged in accordance with a predetermined rule in order to extract light from inside integrator 100. More specifically, with respect to a central axis AX1 of hemispheric portion 102, observation window 110 and observation window 120 are disposed at respective positions opposite to each other. Namely, observation windows 110 and 120 are arranged symmetrically with respect to the line (central axis AX1) passing through the apex of hemispheric portion 102 and the substantial center of curvature O thereof.

In other words, observation windows 110 and 120 are provided at respective positions where hemispheric portion 102 and a plane perpendicular to central axis AX1 of hemispheric portion 102 meet each other and where the positions are point symmetrical to each other with respect to central axis AX1 of hemispheric portion 102.

<2. Verification of the Effect by Simulation>

Figure 7:
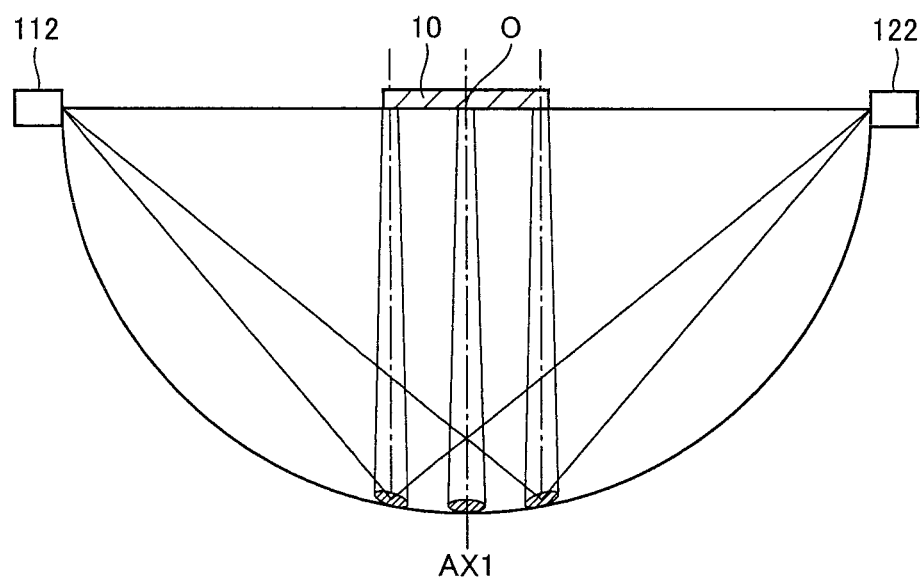
FIG. 7 is a diagram showing an optical model used for simulating anisotropy of the sensitivity obtained in the optical characteristic measuring apparatus shown in FIG. 5.
Figure 8:
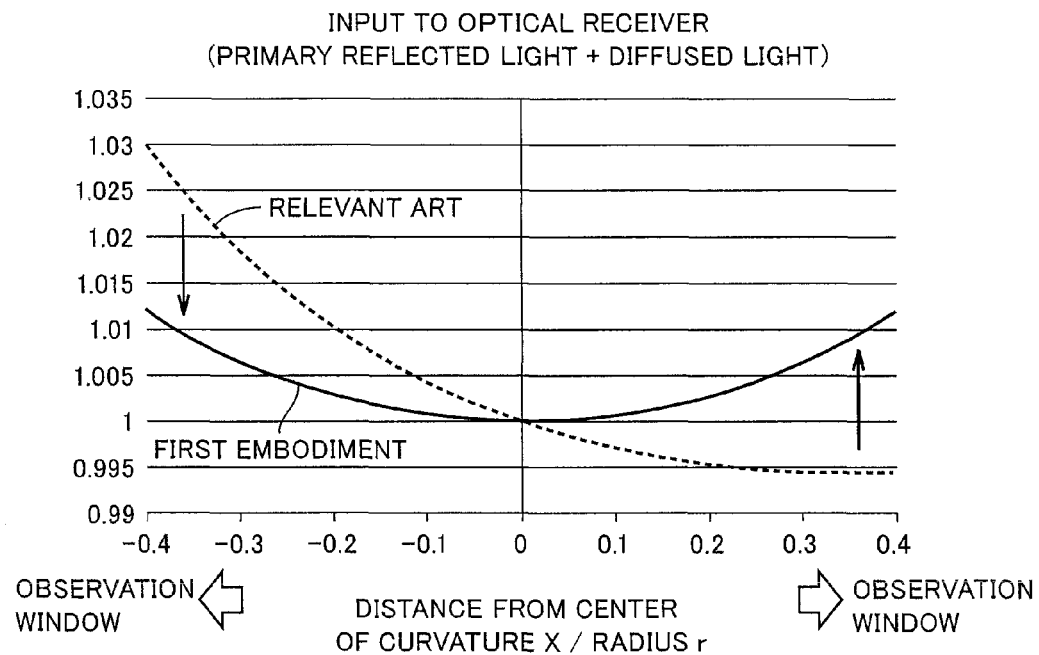
FIG. 8 is a diagram showing an example of the anisotropy of the sensitivity obtained in the optical model shown in FIG. 7.

Next, there will be illustrated the results of verification, by simulation, of the fact that the anisotropy of the sensitivity is alleviated by optical characteristic measuring apparatus 2 according to the first embodiment described above. FIG. 7 is a diagram showing an optical model used for simulating the anisotropy of the sensitivity obtained in optical characteristic measuring apparatus 2 shown in FIG. 5. FIG. 8 is a diagram showing an example of the anisotropy of the sensitivity obtained in the optical model shown in FIG. 7. Regarding the simulation illustrated in FIGS. 7 and 8 as well, it is supposed that the luminous intensity distribution of light-emitting devices constituting light source 10 is relatively narrow. FIG. 8 together shows the results shown in FIG. 4 of simulation for optical characteristic measuring apparatus 1 according to the relevant art.

Optical characteristic measuring apparatus 1 according to the relevant art is provided with only one observation window 410. In this case, as shown in FIG. 8, the light emitted from a light-emitting device at the position separated from the center of curvature O by a distance corresponding to 20% of the diameter to irradiate optical receiver 300 has a variation of approximately 1.5%. In contrast, optical characteristic measuring apparatus 2 according to the first embodiment is provided with two observation windows 110 and 120 arranged so that the windows are opposite to each other with respect to the center of curvature O of hemispheric portion 102. This configuration is employed to allow the variation of the light emitted from a light-emitting device at the position separated from the center of curvature O by the distance corresponding to 20% of the diameter to irradiate optical receiver 300 to be reduced to within 0.3% as shown in FIG. 8.

Regarding the variation of the light emitted from a light-emitting device at the position separated from the center of curvature O by a distance corresponding to 35% of the diameter to irradiate optical receiver 300, the variation is approximately 3% in optical characteristic measuring apparatus 1 according to the relevant art, while the variation is reduced to within 1% in optical characteristic measuring apparatus 2 according to the first embodiment.

<3. Conclusion>

Optical characteristic measuring apparatus 1 according to the first embodiment includes integrator 100 constituted of hemispheric portion 102 and plane portion 106. In integrator 100, observation windows 110 and 120 are arranged on the curved surface of hemispheric portion 102 and in the vicinity of plane portion 106 so that the windows are opposite to each other with respect to the substantial center of curvature O of hemispheric portion 102. The integrated value of the illuminance measured through these observation windows 110 and 120 can be used to reduce the anisotropy of the sensitivity. Namely, for a light source which occupies a region including a relatively distant position from the center of curvature O of hemispheric portion 102 as well, its optical characteristic can more accurately be measured. In other words, a measurement error can be reduced that results from the spatial illuminance nonuniformity on the inner wall of hemispheric portion 102 that occurs due to difference in position between light-emitting devices constituting light source 10 attached to light source window 104.

Moreover, in optical characteristic measuring apparatus 1 according to the first embodiment, the light extracted from observation window 110 and the light extracted from observation window 120 are optically averaged (integrated) by optical coupler 109, and therefore, a process to be performed on the received light similar to that in the case where one observation window is provided can be employed.

D. First Modification of First Embodiment

Regarding the above-described first embodiment, optical characteristic measuring apparatus 2 provided with two observation windows 110 and 120 in hemispheric portion 102 has been illustrated by way of example. In order to alleviate the anisotropy of the sensitivity, a greater number of observation windows may be provided. In the following, an optical characteristic measuring apparatus 3 provided with four observation windows in the hemispheric portion will be illustrated by way of example.

Figure 9:
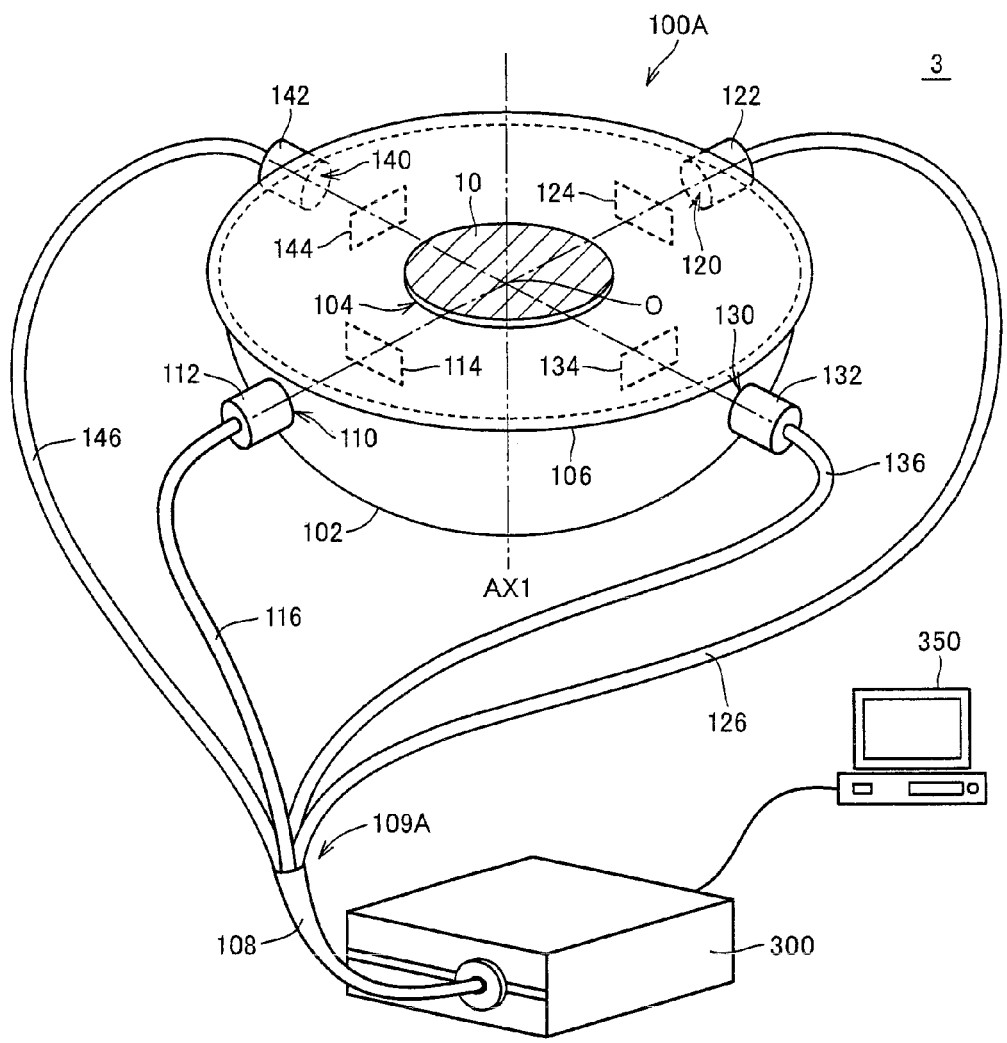
FIG. 9 is a schematic diagram showing an external appearance of an optical characteristic measuring apparatus according to a first modification of the first embodiment.

FIG. 9 is a schematic diagram showing an external appearance of optical characteristic measuring apparatus 3 according to a first modification of the first embodiment. Referring to FIG. 9, optical characteristic measuring apparatus 3 includes a hemispherical integrator 100A, an optical receiver 300 for receiving the light inside integrator 100A, and a control unit 350 for controlling optical receiver 300.

More specifically, integrator 100A includes a hemispheric portion 102 having a reflective surface on its inner wall, and a plane portion 106 arranged to close the opening of hemispheric portion 102 and having a reflective surface on the inner-wall side of hemispheric portion 102. Plane portion 106 is arranged so that the substantial center of curvature O of hemispheric portion 102 is located on the surface of plane portion 106. Integrator 100A has a similar configuration to integrator 100 shown in FIG. 5 except for the number of observation windows, and therefore, the detailed description of the common components will not be repeated.

Hemispheric portion 102 is provided with observation windows 110, 120, 130, 140 which are each an opening for extracting light from inside integrator 100A, as well as extraction members 112, 122, 132, 142 communicating with observation windows 110, 120, 130, 140, respectively.

The inner wall of hemispheric portion 102 is further provided with baffles 114, 124, 134, 144 associated with respective fields of view of observation windows 110, 120, 130, 140 and arranged closer to the substantial center of curvature O of hemispheric portion 102. More specifically, baffles 114, 124, 134, 144 prevent the light from light source 10 from directly irradiating observation windows 110, 120, 130, 140.

Extraction members 112, 122, 132, 142 are optically connected to optical receiver 300 through optical fibers 116, 126, 136, 146 which are optical guide means. More specifically, optical fibers 116, 126, 136, 146 are coupled into one fiber at an optical coupler 109A, and then optically connected to optical receiver 300 through an optical fiber 108. Optical coupler 109A couples light beams guided respectively through optical fibers 116, 126, 136, 146 to thereby average (integrate) these light beams. Such an optical coupler 109A is typically configured by means of a Y-shaped fiber or the like which is a bundle of a plurality of optical fibers.

Thus, in optical characteristic measuring apparatus 3, optical receiver 300 receives the light inside integrator 100A through a plurality of observation windows 110, 120, 130, 140. Optical characteristic measuring apparatus 3 includes a connector (optical fibers 116, 126, 136, 146 and optical fiber 108) for optically connecting a plurality of observation windows 110, 120, 130, 140 to optical receiver 300. This connector includes optical coupler 109A coupling respective light beams from a plurality of observation windows 110, 120, 130, 140. Namely, the light beams captured respectively in a plurality of observation windows 110, 120, 130, 140 are guided by optical guide means such as optical fibers to optical receiver 300.

In optical characteristic measuring apparatus 3 according to the first modification of the first embodiment shown in FIG. 9, hemispheric portion 102 is provided with four observation windows 110, 120, 130, 140. These observation windows 110, 120, 130, 140 are arranged in accordance with a predetermined rule in order to extract light from inside integrator 100A. More specifically, with respect to a central axis AX1 of hemispheric portion 102, observation window 110 and observation window 120 are disposed at respective positions opposite to each other, and observation window 130 and observation window 140 are disposed at respective positions opposite to each other. Namely, integrator 100A has a pair of observation windows (a set of observation window 110 and observation window 120 and a set of observation window 130 and observation window 140) opposite to each other with respect to the line (central axis AX1) passing through the apex and the substantial center of curvature O of hemispheric portion 102.

In other words, observation windows 110, 120, 130, 140 are arranged at respective positions that are located on the line of intersection between hemispheric portion 102 and a plane perpendicular to central axis AX1 of hemispheric portion 102 so that an angle formed by any two adjacent positions of these positions relative to central axis AX1 of hemispheric portion 102 and an angle formed by other two adjacent positions thereof relative to central axis AX1 of hemispheric portion 102 are identical to each other (the angle is 90° in FIG. 9). In the example shown in FIG. 9, the optical axis passing through observation windows 110 and 120 and the optical axis passing through observation windows 130 and 140 are orthogonal to each other.

In the first modification of the first embodiment, a greater number of observation windows is provided relative to the first embodiment, and therefore, the anisotropy of the sensitivity can further be reduced. Accordingly, for a light source which occupies a region including a relatively distant position from the center of curvature O of hemispheric portion 102 as well, its optical characteristic can more accurately be measured. In other words, a measurement error can further be reduced that results from the spatial illuminance nonuniformity on the inner wall of hemispheric portion 102 that occurs due to difference in position between light-emitting devices constituting light source 10 attached to light source window 104.

E. Second Modification of First Embodiment

Regarding the first embodiment and the first modification described above, the configuration has been illustrated by way of example in which one pair or a plurality of pairs of observation windows arranged opposite to each other is/are provided. It should be noted, however, as long as the observation windows are arranged in accordance with a certain rule for alleviating the anisotropy of the sensitivity, the observation windows may not be arranged opposite to each other. In the following, an optical characteristic measuring apparatus 4 in which three observation windows are symmetrically arranged in the hemispheric portion will be illustrated by way of example.

Figure 10:
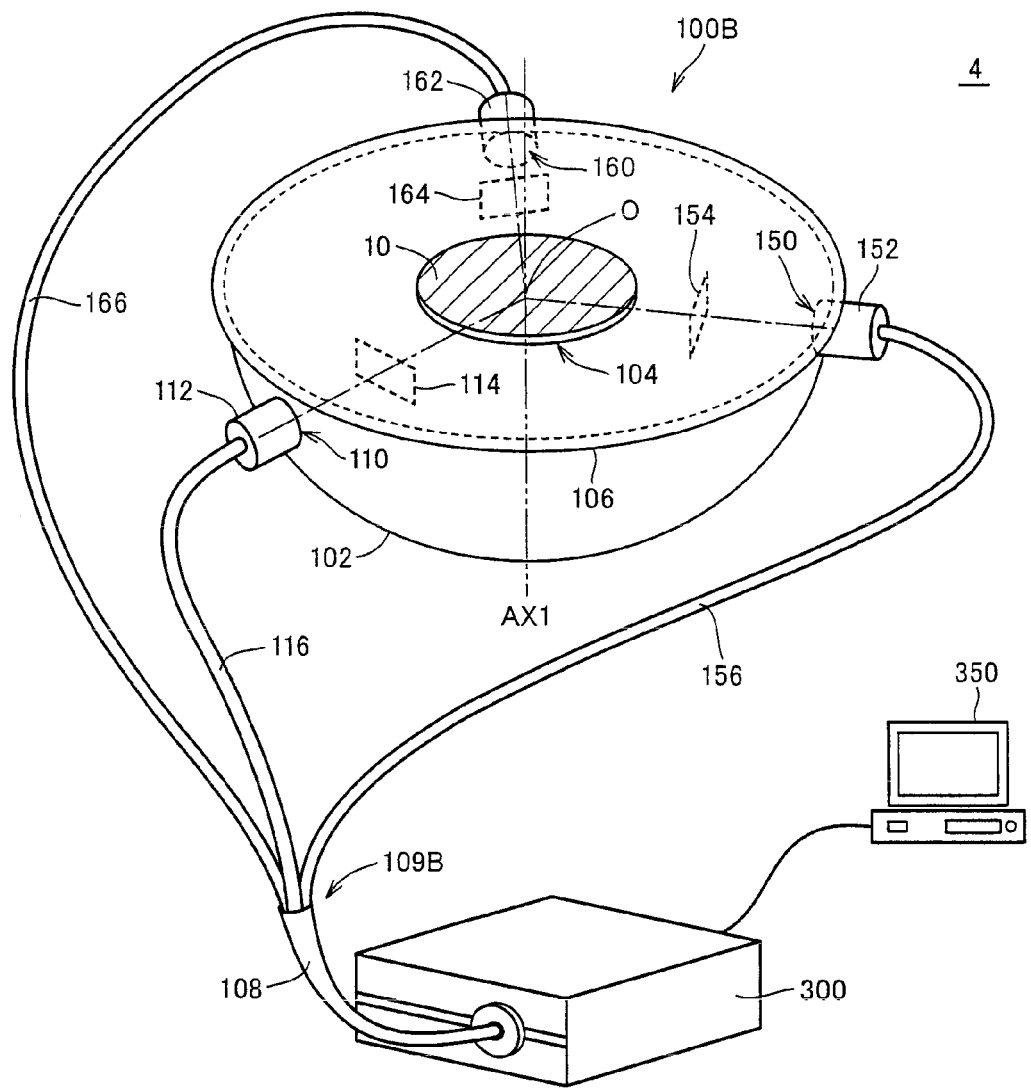
FIG. 10 is a schematic diagram showing an external appearance of an optical characteristic measuring apparatus according to a second modification of the first embodiment.

FIG. 10 is a schematic diagram showing an external appearance of optical characteristic measuring apparatus 4 according to a second modification of the first embodiment. Referring to FIG. 10, optical characteristic measuring apparatus 4 includes a hemispherical integrator 100B, an optical receiver 300 for receiving the light inside integrator 100B, and a control unit 350 for controlling optical receiver 300.

More specifically, integrator 100B includes a hemispheric portion 102 having a reflective surface on its inner wall, and a plane portion 106 arranged to close the opening of hemispheric portion 102 and having a reflective surface on the inner-wall side of hemispheric portion 102. Plane portion 106 is arranged so that the substantial center of curvature O of hemispheric portion 102 is located on the surface of plane portion 106. Integrator 100B has a similar configuration to integrator 100 shown in FIG. 5 except for the number of observation windows, and therefore, the detailed description of the common components will not be repeated.

Hemispheric portion 102B is provided with observation windows 110, 150, 160 which are each an opening for extracting light from inside hemispheric portion 102B, as well as extraction members 112, 152, 162 communicating with observation windows 110, 150, 160, respectively.

The inner wall of hemispheric portion 102 is further provided with baffles 114, 154, 164 associated with respective fields of view of observation windows 110, 150, 160 respectively and arranged closer to the substantial center of curvature O of hemispheric portion 102. More specifically, baffles 114, 154, 164 prevent the light from light source 10 from directly irradiating observation windows 110, 150, 160.

Extraction members 112, 152, 162 are optically connected to optical receiver 300 through optical fibers 116, 156, 166 respectively which are optical guide means. More specifically, optical fibers 116, 156, 166 are coupled into one fiber at an optical coupler 109B, and then optically connected to optical receiver 300 through an optical fiber 108. Optical coupler 109B couples light beams guided respectively through optical fibers 116, 156, 166 to thereby average (integrate) these light beams. Such an optical coupler 109B is typically configured by means of a Y-shaped fiber or the like which is a bundle of a plurality of optical fibers.

Thus, in optical characteristic measuring apparatus 4, optical receiver 300 receives the light inside integrator 100B through a plurality of observation windows 110, 150, 160. Optical characteristic measuring apparatus 4 includes a connector (optical fibers 116, 156, 166 and optical fiber 108) for optically connecting a plurality of observation windows 110, 150, 160 to optical receiver 300. This connector includes optical coupler 109B coupling respective light beams from a plurality of observation windows 110, 150, 160. Namely, the light beams captured respectively in a plurality of observation windows 110, 150, 160 are guided by optical guide means such as optical fibers to optical receiver 300.

In optical characteristic measuring apparatus 4 according to the second modification of the first embodiment shown in FIG. 10, hemispheric portion 102 is provided with three observation windows 110, 150, 160. These observation windows 110, 150, 160 are arranged in accordance with a predetermined rule in order to extract light from inside integrator 100B. More specifically, integrator 100B has observation windows 110, 150, 160 that are arranged symmetrically to each other with respect to the line (central axis AX1) passing through the apex and the substantial center of curvature O of hemispheric portion 102.

In other words, observation windows 110, 150, 160 are arranged at respective positions that are located on the line of intersection between hemispheric portion 102 and a plane perpendicular to central axis AX1 of hemispheric portion 102 so that an angle formed by any two adjacent positions of these positions relative to central axis AX1 of hemispheric portion 102 and an angle formed by other two adjacent positions thereof relative to central axis AX1 of hemispheric portion 102 are identical to each other (the angle is 120° in FIG. 9).

In the second modification of the first embodiment, a greater number of observation windows is provided relative to the first embodiment, and therefore, the anisotropy of the sensitivity can further be reduced. Accordingly, for a light source which occupies a region including a relatively distant position from the center of curvature O of hemispheric portion 102 as well, its optical characteristic can more accurately be measured. In other words, a measurement error can further be reduced that results from the spatial illuminance nonuniformity on the inner wall of hemispheric portion 102 that occurs due to difference in position between light-emitting devices constituting light source 10 attached to light source window 104.

F. Third Modification of First Embodiment

Regarding the first embodiment as well as the first modification and the second modification described above, the configurations have been illustrated by way of example in which a plurality of observation windows are provided in hemispheric portion 102. It should be noted, however, the positions where observation windows are provided are not limited to hemispheric portion 102. In the following, an optical characteristic measuring apparatus 5 in which two observation windows are symmetrically arranged in the plane portion will be illustrated by way of example.

Figure 11:
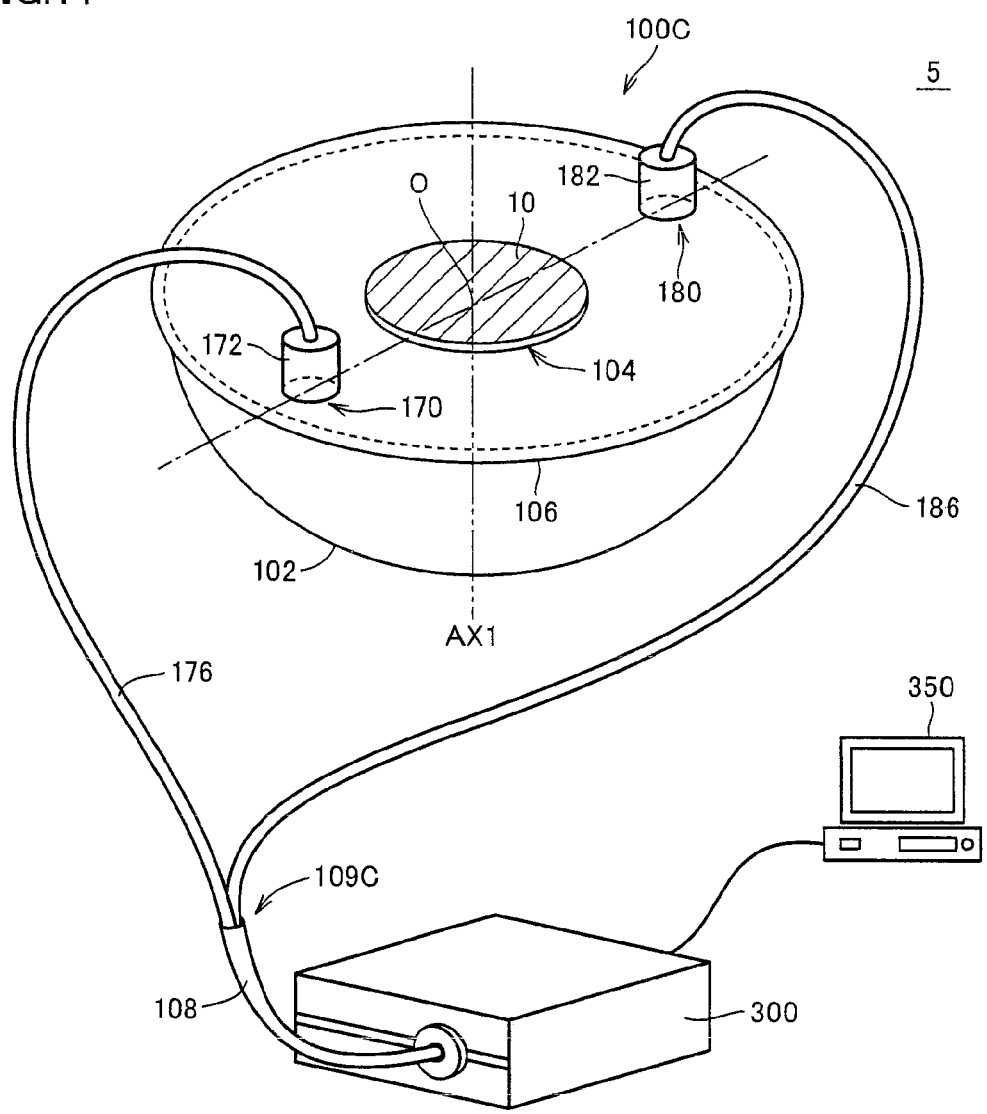
FIG. 11 is a schematic diagram showing an external appearance of an optical characteristic measuring apparatus according to a third modification of the first embodiment.
Figure 12:
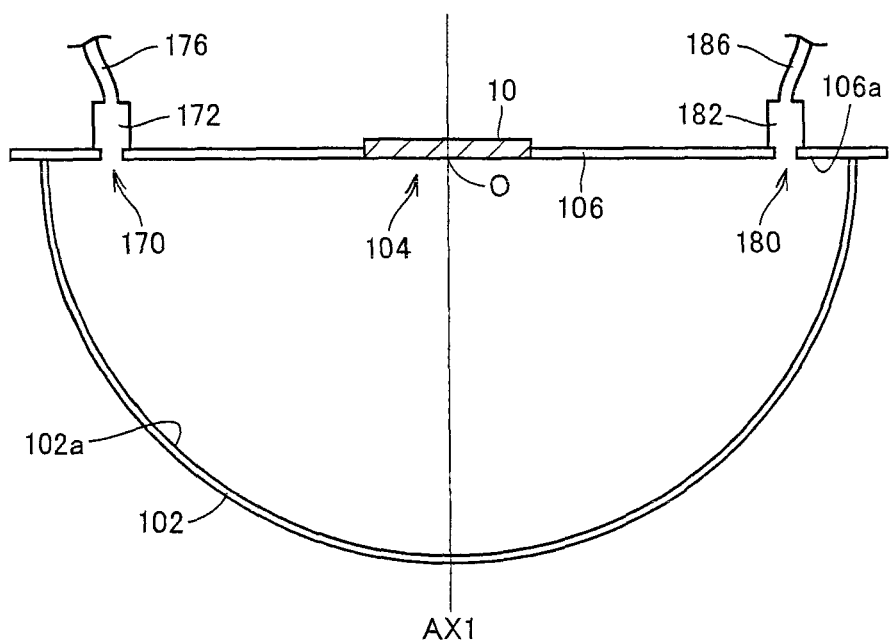
FIG. 12 is a schematic diagram showing a cross-sectional structure of an integrator included in the optical characteristic measuring apparatus according to the third modification of the first embodiment.

FIG. 11 is a schematic diagram showing an external appearance of optical characteristic measuring apparatus 5 according to a third modification of the first embodiment. FIG. 12 is a schematic diagram showing a cross-sectional structure of an integrator 100C included in optical characteristic measuring apparatus 5 according to the third modification of the first embodiment.

Referring to FIGS. 11 and 12, optical characteristic measuring apparatus 5 includes hemispherical integrator 100C, an optical receiver 300 for receiving the light inside integrator 100C, and a control unit 350 for controlling optical receiver 300.

More specifically, integrator 100C includes a hemispheric portion 102 having a reflective surface on its inner wall, and a plane portion 106 arranged to close the opening of hemispheric portion 102 and having a reflective surface on the inner-wall side of hemispheric portion 102. Plane portion 106 is arranged so that the substantial center of curvature O of hemispheric portion 102 is located on the surface of plane portion 106. Integrator 100C has a similar configuration to integrator 100 shown in FIG. 5 except for the positions of observation windows, and therefore, the detailed description of the common components will not be repeated.

Plane portion 106 is provided with observation windows 170 and 180 which are each an opening for extracting light from inside integrator 100C, as well as extraction members 172 and 182 communicating respectively with observation windows 170 and 180. In integrator 100C, it is unnecessary to provide baffles associated with observation windows 170 and 180. The reason for this is as follows. Observation windows 170 and 180 and light source 10 are located on the same plane, and therefore, even if baffles are not provided, the light from light source 10 can be prevented from directly irradiating observation windows 170 and 180. In order to further reduce ambient light, it is preferable to provide baffles.

Extraction members 172 and 182 are optically connected to optical receiver 300 respectively through optical fibers 176 and 186 which are optical guide means. More specifically, optical fibers 176 and 186 are coupled into one fiber at an optical coupler 109C, and then optically connected to optical receiver 300 through an optical fiber 108. Optical coupler 109C couples the light beams guided respectively through optical fibers 176 and 186 to thereby average (integrate) these light beams. Such an optical coupler 109C is typically configured by means of a Y-shaped fiber or the like which is a bundle of a plurality of optical fibers.

Thus, in optical characteristic measuring apparatus 5, optical receiver 300 receives the light inside integrator 100C through a plurality of observation windows 170 and 180. Optical characteristic measuring apparatus 5 includes a connector (optical fibers 176 and 186 as well as optical fiber 108) optically connecting a plurality of observation windows 170 and 180 to optical receiver 300. This connector includes optical coupler 109C coupling respective light beams from a plurality of observation windows 170 and 180. Namely, the light beams captured respectively in a plurality of observation windows 170 and 180 are guided by optical guide means such as optical fibers to optical receiver 300.

In optical characteristic measuring apparatus 5 according to the third modification of the first embodiment shown in FIGS. 11 and 12, two observation windows 170 and 180 are provided in plane portion 106. These observation windows 170 and 180 are arranged in accordance with a predetermined rule in order to extract light from inside integrator 100C. More specifically, observation windows 170 and 180 are provided at respective positions opposite to each other with respect to central axis AX1 of hemispheric portion 102. Namely, integrator 100C has observation windows (observation window 170 and observation window 180) opposite to each other with respect to the line (central axis AX1) passing through the apex and the substantial center of curvature O of hemispheric portion 102.

For the third modification of the first embodiment, it is unnecessary to provide baffles, and therefore, there is no light absorption by the baffles and optical characteristics can be measured with less error relative to the first embodiment.

Moreover, a further modification of the third modification of the first embodiment may also be employed in which four observation windows are arranged at respective positions separated from each other by 90° on plane portion 106 or a configuration in which three observation windows are arranged at respective positions separated from each other by 120° on plane portion 106, as described above in connection with the first modification and the second modification of the first embodiment, respectively.

Furthermore, a configuration may also be employed in which a plurality of observation windows are arranged in plane portion 106 and a plurality of observation windows are also arranged in hemispheric portion 102.

G. Fourth Modification of First Embodiment

Regarding the first to fourth modifications of the first embodiment described above, the configurations have been illustrated by way of example in which the light beams guided through the optical fibers are coupled by the optical coupler and then the optical characteristic is measured by means of one optical receiver. In contrast, the optical characteristic of light source 10 may also be measured by arranging the same number of optical receivers as the number of observation windows provided in the integrator and performing a statistical operation (typically averaging) on respective results of measurement by the optical receivers. Namely, instead of preprocessing of optically coupling light beams extracted from the integrator, post processing may be performed, namely the results of measurement for respective light beams extracted from the integrator may electronically be coupled.

According to the fourth modification of the first embodiment, the degree of freedom of the statistical operation in calculating the optical characteristic of light source 10 can further be enhanced. For example, respective results of measurement for the light beams extracted through respective observation windows may be multiplied by a weight factor depending on the shape or the like of light source 10 and then the optical characteristic may be calculated.

H. Second Embodiment

<1. Configuration of Apparatus>

Regarding the above-described first embodiment and its modifications, the optical characteristic measuring apparatuses including the hemispherical integrator have been illustrated by way of example. The new technical idea arrived at by the inventors of the present application, however, is also applicable to an optical characteristic measuring apparatus including a common integrating sphere. In the following, an embodiment in which the technical idea of the present invention is applied to an integrating sphere will be illustrated by way of example.

Figure 13:
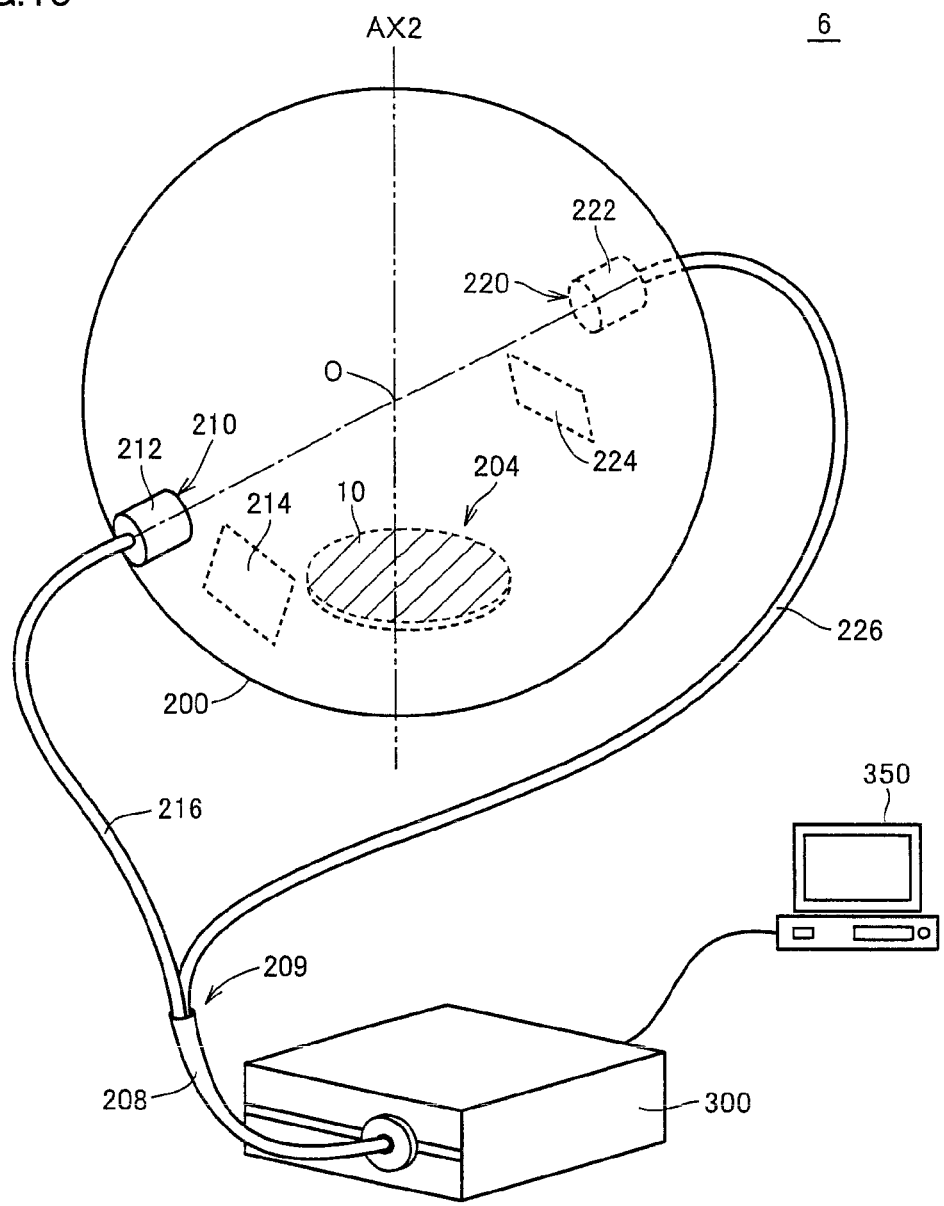
FIG. 13 is a schematic diagram showing an external appearance of an optical characteristic measuring apparatus according to a second embodiment.
Figure 14:
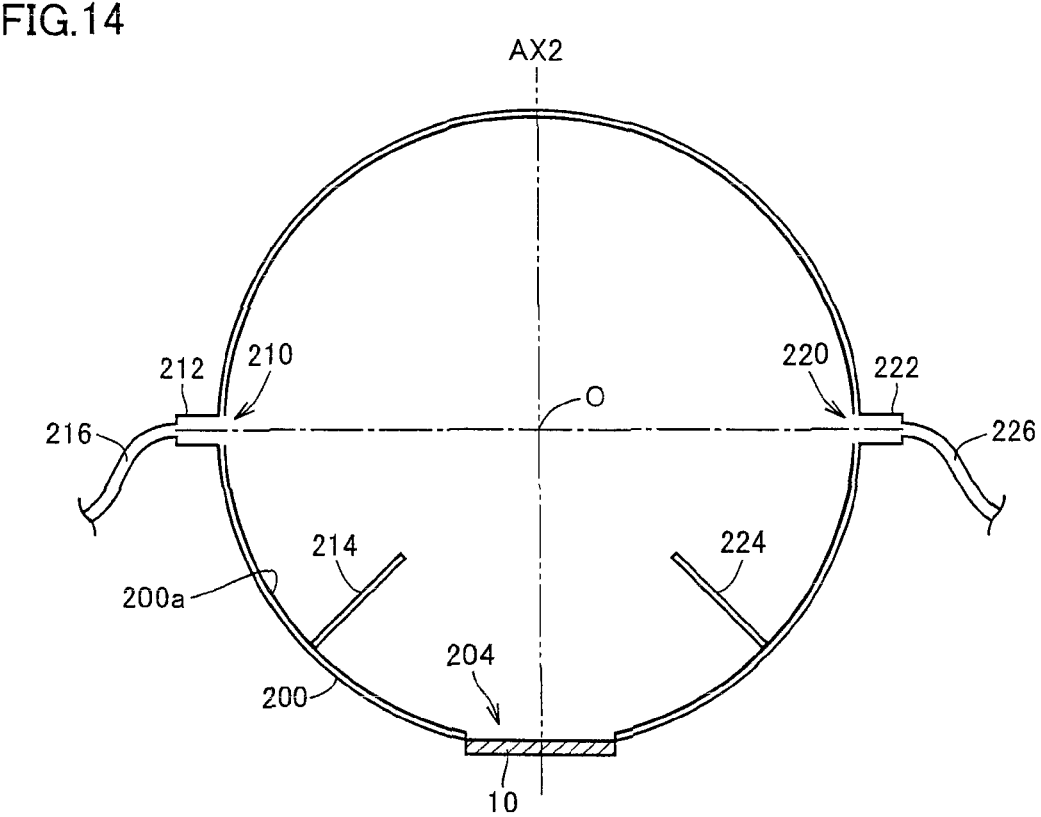
FIG. 14 is a schematic diagram showing a cross-sectional structure of an integrating sphere included in the optical characteristic measuring apparatus according to the second embodiment.

FIG. 13 is a schematic diagram showing an external appearance of an optical characteristic measuring apparatus 6 according to a second embodiment. FIG. 14 is a schematic diagram showing a cross-sectional structure of an integrating sphere 200 included in optical characteristic measuring apparatus 6 according to the second embodiment.

Referring to FIGS. 13 and 14, optical characteristic measuring apparatus 6 includes integrating sphere 200, an optical receiver 300 for receiving the light inside integrating sphere 200, and a control unit 350 for controlling optical receiver 300. A light source 10 to be measured (sample light source) is attached to a light source window 204 provided in integrating sphere 200.

More specifically, integrating sphere 200 has a reflective surface 200a on its inner wall. Reflective surface 200a of integrating sphere 200 is provided for example by a diffuse reflective layer formed by applying or spraying a diffuse material such as barium sulfate or PTFE. Integrating sphere 200 is provided with observation windows 210 and 220 which are each an opening for extracting light from inside integrating sphere 200, as well as extraction members 212 and 222 communicating respectively with observation windows 210 and 220. Thus, integrating sphere 200 is a spherical body in which light source window 204 is formed for attaching light source 10 thereto and which has reflective surface 200a on its inner wall.

The inner wall of integrating sphere 200 is provided with baffles 214 and 224 associated with respective fields of view of observation windows 210 and 220 and arranged closer to light source 10. More specifically, baffles 214 and 224 prevent the light from light source 10 from directly irradiating observation windows 210 and 220.

Extraction members 212 and 222 are optically connected to optical receiver 300 respectively through optical fibers 216 and 226 which are optical guide means. More specifically, optical fibers 216 and 226 are coupled into one fiber at an optical coupler 209, and then optically connected to optical receiver 300 through an optical fiber 208. Optical coupler 209 couples the light beams guided respectively through optical fibers 216 and 226 to thereby average (integrate) these light beams. Such an optical coupler 109 is typically configured by means of a Y-shaped fiber or the like which is a bundle of a plurality of optical fibers.

Thus, in optical characteristic measuring apparatus 6, optical receiver 300 receives the light inside integrating sphere 200 through a plurality of observation windows 210 and 220. Optical characteristic measuring apparatus 6 includes a connector (optical fibers 216 and 226 as well as optical fiber 208) optically connecting a plurality of observation windows 210 and 220 to optical receiver 300. This connector includes optical coupler 209 coupling respective light beams from a plurality of observation windows 210 and 220. Namely, the light beams captured respectively in a plurality of observation windows 210 and 220 are guided by optical guide means such as optical fibers to optical receiver 300.

In optical characteristic measuring apparatus 6 according to the second embodiment shown in FIGS. 13 and 14, two observation windows 210 and 220 are provided in integrating sphere 200. These observation windows 210 and 220 are arranged in accordance with a predetermined rule in order to extract the light from inside integrating sphere 200. More specifically, with respect to a central axis AX2 of integrating sphere 200, observation windows 210 and 220 are provided at respective positions opposite to each other. Namely, integrating sphere 200 includes windows (observation windows 210 and 220) for extracting the light from inside integrating sphere 200 that are arranged symmetrically with respect to the line (central axis AX2) passing through the center O of integrating sphere 200 and the center of light source window 204.

In other words, observation windows 210 and 220 are arranged at respective positions that are located on the line of intersection between integrating sphere 200 and a plane perpendicular to central axis AX2 of integrating sphere 200 so that the positions are opposite to each other with respect to central axis AX2 of integrating sphere 200. In order to reduce absorption of light by the baffles, it is preferable to provide observation windows 210 and 220 on the horizontal axis including the center O of integrating sphere 200. The positions of the baffles, however, are not limited to them.

For example, observation windows 210 and 220 may be provided above or below the horizontal axis including the center O of integrating sphere 200.

Other components are similar to those of the above-described optical characteristic measuring apparatus, and therefore, the detailed description of the common components will not be repeated.

<2. Verification of the Effect by Simulation>

Figure 15:
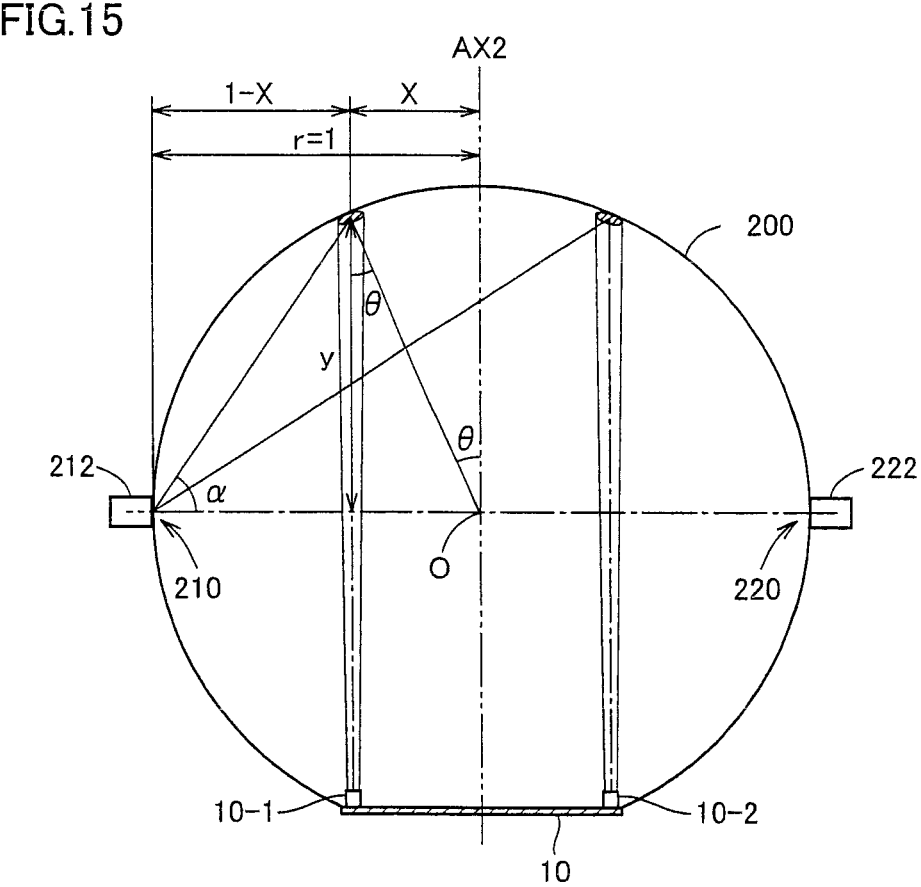
FIG. 15 is a diagram showing an optical model used for simulating anisotropy of the sensitivity obtained in the optical characteristic measuring apparatus shown in FIGS. 13 and 14.

Next, there will be illustrated the results of verification, by simulation, of the fact that the anisotropy of the sensitivity is alleviated by optical characteristic measuring apparatus 6 according to the second embodiment described above. FIG. 15 is a diagram showing an optical model used for simulating the anisotropy of the sensitivity obtained in optical characteristic measuring apparatus 6 shown in FIGS. 13 and 14. Regarding the simulation illustrated in FIG. 15 as well, it is supposed that the luminous intensity distribution of light-emitting devices 10-1 and 10-2 constituting light source 10 is relatively narrow.

In the case of the optical model shown in FIG. 15, the anisotropy of the sensitivity is similar to that of the optical model shown in FIG. 7. Namely, in the case where observation window 210 is provided in integrating sphere 200, it has the anisotropy of the sensitivity similar to that of "Relevant Art" shown in FIG. 8. In contrast, in addition to observation window 210, observation window 220 is provided in integrating sphere 200 to thereby improve the anisotropy of the sensitivity obtained in a similar manner to "First Embodiment" shown in FIG. 8.

<3. Conclusion>

Optical characteristic measuring apparatus 6 according to the second embodiment includes integrating sphere 200 provided with observation windows 210 and 220 which are each an opening for extracting the light from inside the integrating sphere. The integrated value of the illuminance measured through these observation windows 210 and 220 can be used to reduce the anisotropy of the sensitivity. Namely, for a light source which is occupies a region including a relatively distant position from central axis AX2 of integrating sphere 200 as well, its optical characteristic can more accurately be measured. In other words, a measurement error can be reduced that results from the spatial illuminance nonuniformity on the inner wall of integrating sphere 200 that occurs due to difference in position between light-emitting devices constituting light source 10 attached to light source window 204.

I. Modification of Second Embodiment

For optical characteristic measuring apparatus 6 according to the second embodiment shown in FIGS. 13 and 14 as well, modifications similar to respective modifications of the first embodiment described above are possible. Namely, as long as the anisotropy of the sensitivity can be reduced, the number and respective positions of the observation windows may be any.

Figure 16:
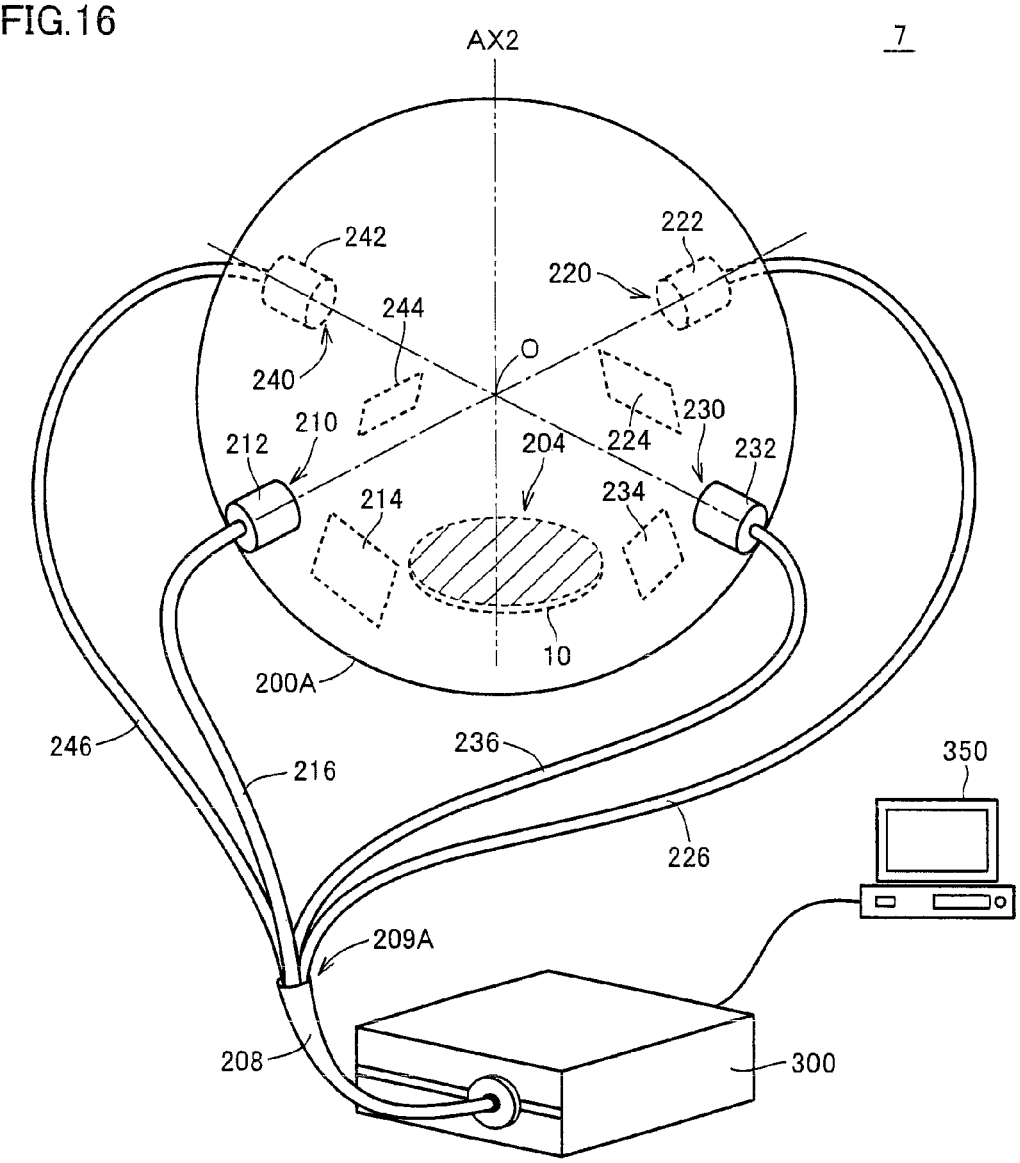
FIG. 16 is a schematic diagram showing an external appearance of an optical characteristic measuring apparatus according to a modification of the second embodiment.

FIG. 16 is a schematic diagram showing an external appearance of an optical characteristic measuring apparatus 7 according to a modification of the second embodiment. In optical characteristic measuring apparatus 7 shown in FIG. 16, a greater number of observation windows is arranged relative to optical characteristic measuring apparatus 6 shown in FIGS. 13 and 14.

Referring to FIG. 16, optical characteristic measuring apparatus 7 includes an integrating sphere 200A, an optical receiver 300 for receiving the light inside integrating sphere 200A, and a control unit 350 for controlling optical receiver 300. Integrating sphere 200A is provided with observation windows 210, 220, 230, 240 which are each an opening for extracting light from inside integrating sphere 200A, as well as extraction members 212, 222, 232, 242 communicating respectively with observation windows 210, 220, 230, 240.

The inner wall of integrating sphere 200A is provided with baffles 214, 224, 234, 244 associated with respective fields of view of observation windows 210, 220, 230, 240 and arranged closer to light source 10. More specifically, baffles 214, 224, 234, 244 prevent the light from light source 10 from directly irradiating observation windows 210, 220, 230, 240.

Extraction members 212, 222, 232, 242 are optically connected to optical receiver 300 respectively through optical fibers 216, 226, 236, 246 which are optical guide means. More specifically, optical fibers 216, 226, 236, 246 are coupled into one fiber at an optical coupler 209A, and then optically connected to optical receiver 300 through an optical fiber 208.

Optical characteristic measuring apparatus 7 shown in FIG. 16 is provided with a greater number of observation windows relative to optical characteristic measuring apparatus 6 shown in FIGS. 13 and 14, and therefore, the anisotropy of the sensitivity can further be reduced.

Moreover, a still greater number of observation windows may be provided. In this case, it is preferable to provide a pair of or a plurality of pairs of observation windows so that they are opposite to each other with respect to the center O of integrating sphere 200.

Alternatively, like those shown in FIG. 10, a plurality of observation windows may be arranged symmetrically with respect to central axis AX2 of integrating sphere 200. For example, on a horizontal axis including the center O of integrating sphere 200, observation windows may be arranged at respective positions so that an angle formed by any two adjacent positions of these positions relative to central axis AX2 of integrating sphere 200 and an angle formed by other two adjacent positions thereof relative to central axis AX2 of integrating sphere 200 are identical to each other (the angle is 120° for example).

Furthermore, a configuration may also be employed in which the same number of optical receivers as the number of observation windows are used, similarly to the fourth modification of the first embodiment.

J. Advantages

The optical characteristic measuring apparatus according to the present embodiments can reduce the influence of the anisotropy of the sensitivity depending on the position of the light source. Even when the light source is large relative to the integrating space, its total luminous flux and the like can more accurately be measured.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An optical characteristic measuring apparatus comprising:
   a spherical body comprising:
      a first window to which a light source is to be attached;
      a reflective surface provided on an inner wall of the spherical body; and
      a plurality of second windows provided symmetrically with respect to a line passing through a center of the spherical body and a center of said first window to extract light from inside said spherical body; and
   a plurality of optical fibers each optically connecting each of the plurality of second windows to an optical receiver to receive light inside the spherical body, the plurality of optical fibers being bundled together to be connected to the optical receiver.

2. The optical characteristic measuring apparatus according to claim 1, further comprising the optical receiver for receiving light inside said spherical body through said plurality of second windows.

3. An optical characteristic measuring apparatus comprising:
   a spherical body comprising:
      a first window to which a light source is to be attached;
      a reflective surface provided on an inner wall of the spherical body; and
      a plurality of second windows provided symmetrically with respect to a line passing through a center of the spherical body and a center of the first window to extract light from inside the spherical body;
   an optical receiver configured to receive light inside the spherical body; and
   a plurality of optical fibers each optically connecting each of the plurality of second windows to the optical receiver so that the optical receiver receives light via all of the plurality of optical fibers together.

* * * * *